INVENTOR.
BY Yoshikazu Taga

Sept. 4, 1962   YOSHIKAZU TAGA   3,052,452
LEAKAGE PREVENTING WELDING CONNECTION
Filed Nov. 6, 1957   3 Sheets-Sheet 3
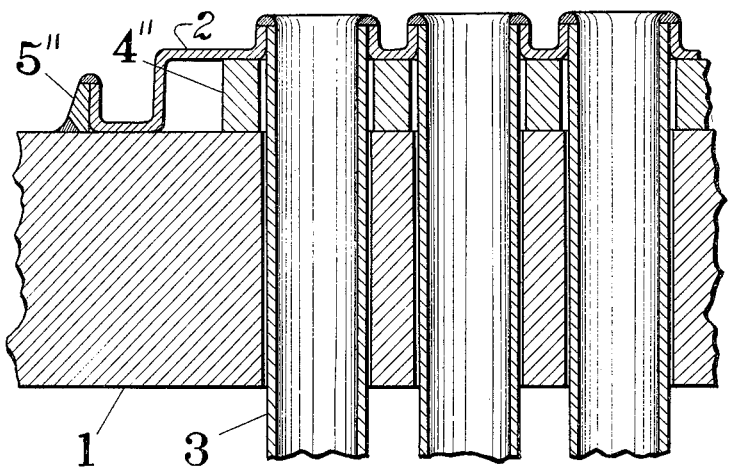
*Fig. 9*
*Fig 11*
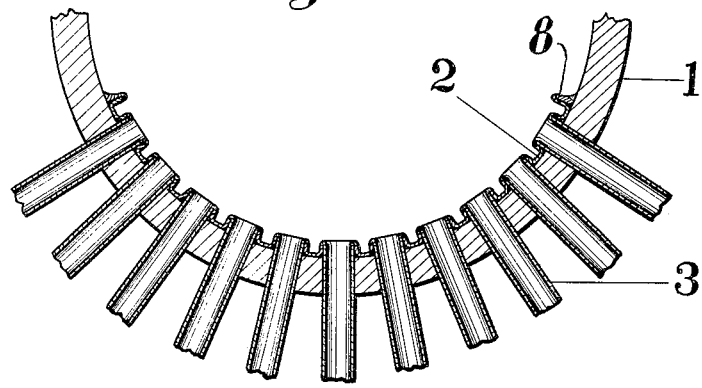
*Fig 13*
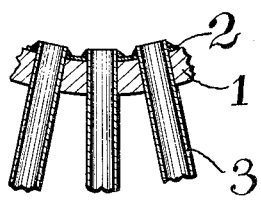
*Fig 12*
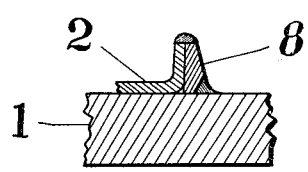
INVENTOR.
BY Yoshikazu Taga United States Patent Office 3,052,452
Patented Sept. 4, 1962

3,052,452
LEAKAGE PREVENTING WELDING
CONNECTION
Yoshikazu Taga, 29, 5-chome, Higashi-dori, Sakurazuka,
Toyonaka-shi, Osaka-fu, Japan
Filed Nov. 6, 1957, Ser. No. 694,778
2 Claims. (Cl. 257—224)

This invention relates to a heat exchanger construction and to a novel connection arrangement between a tube and a tube plate.

Further, the present invention relates to a leakage preventing connection between a tube and a tube plate, between which a high degree of air tightness is assured.

When using higher pressure and temperature in a steam power plant, the maintenance of fluid tightness between the tube and tube plate becomes difficult. However, the prevention of leakage is, of course, of a greater necessity when high pressures are being used and even more so when the connections are for an atomic power station or the like.

An example of a use for the connection of the present invention is for various types of heat exchangers, such as feed water heater or drum of a boiler or a condenser for a steam turbine, wherein a vacuum is present in lieu of high pressure fluid.

In the case of a steam condenser where there may be some leakage, cooling water which is usually sea water, as in Japan, will become mixed with the feed water resulting in deterioration of the entire condenser and other portions of the power plant.

The primary object of the present invention, therefore, consists in the prevention of leakage by means of a novel welding connection.

In carrying out the invention, a tube of small wall thickness is welded to an auxiliary tube plate of the same material and substantially the same thickness as the tube, which is then arranged against the relatively thick tube plate.

These together with the various ancillary objects and features of the invention which will become apparent as the following description proceeds, are attained by this invention, preferred arrangements being shown in the accompanying drawings by way of example only wherein:

FIGS. 9 and 10 illustrate sections of a tube plate as applied to a steam condenser; and FIGS. 11, 12 and 13 are sectional detail views of a tube plate applied to a drum for high pressure water tube boiler in accordance with the concepts of the present invention.

Figure 1:
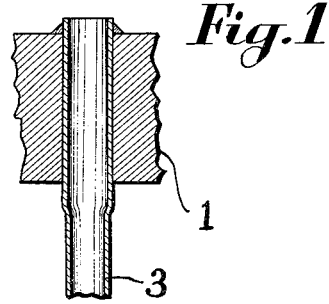
FIG. 1 is an illustration of a conventional welding arrangement.
Figure 2:
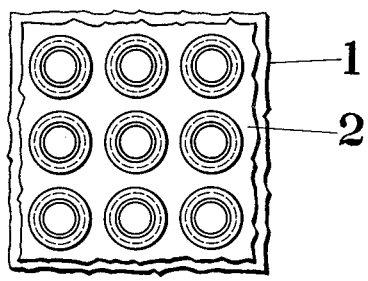
FIG. 2 is a plan view of a welding connection in accordance with the present invention.
Figure 3:
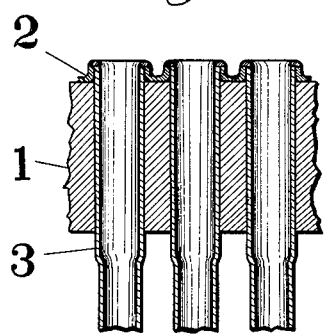
FIG. 3 is a sectional detail view of the arrangement shown in FIG. 2.

With continuing reference to the accompanying drawings wherein like reference numerals designate similar parts throughout the various views, reference numeral 1 generally designates a relatively thick tube plate. An auxiliary tube plate 2 is provided which has stamped out therefrom or otherwise integrally formed therewith cylindrical extensions for receiving tubes 3.

Figure 5:
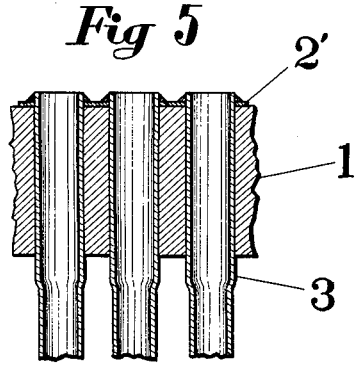
FIG. 5 is an illustration of a modified form of the invention.

As shown in FIG. 5, an auxiliary plate 2' can be used which is not provided with the cylindrical extensions.

In a heat exchanger of any suitable type there is provided in end plate 1, a suitable drum plate 5. Bolts 6 extend through aligned apertures in the end plate 4, the drum plate 5 and the tube plate with packing 7 being disposed between the end plate 4 and the auxiliary plate 2.

Usually, in the feed water heater in a steam power plant, high pressure feed water is passed inside of the tube, and breeded steam having relatively lower pressure is led outside of the tube, and pressure difference therebetween acts on the tube plate, but the pressure is entirely supported by the tube plate 1, because the auxiliary tube plate 2 is very thin and flexible and sticks to the tube plate 1. The cylindrical extension of the auxiliary tube plate 2 is made by drawing. Therefore, the portion to be welded is made to a cylindrical end which is formed thin and adapted for easy temperature rise, so that perfect welding is very easily performed.

As the auxiliary tube plate 2 is merely overlapped, large temperature rise and residual stress will not be caused in the tube plate upon welding, so that the tube plate 1 will not be affected unfavorably.

In general, when any corrosion is apt to occur, special nickel-copper alloys are used for tubes and tube plate, while in the present case, it is practically sufficient to use special alloys only for the auxiliary tube plate 2, and the tube plate 1 may be made of usual carbon steel, when the tube 3 is made of the special alloy, and thus such expensive materials may be saved.

The welding between the tube 3 and the auxiliary tube plate 2 is made without any trouble, because they are made of same material.

FIG. 5 shows another example, wherein the auxiliary tube plate 2' is not provided with cylindrical extensions as that of auxiliary tube 2, and in this case, the welding is somewhat difficult, while the manufacturing of the auxiliary tube plate 2' is simpler and it is convenient when the pitch of tube arrangement is small.

Figure 6:
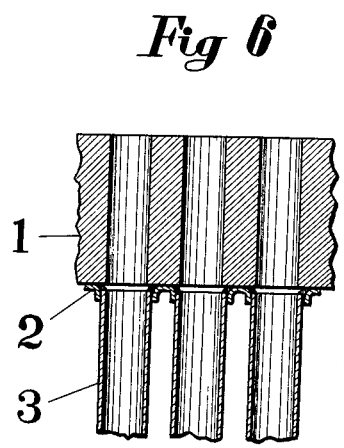
FIG. 6 is a sectional detail view of a portion of a high pressure heat exchanger.
Figure 8:
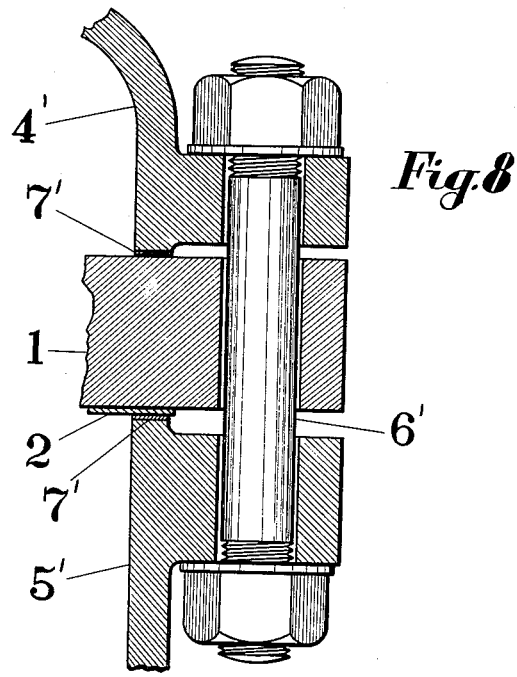
FIG. 8 is a view of a portion of the peripheral part of a heat exchanger.
Figure 7:
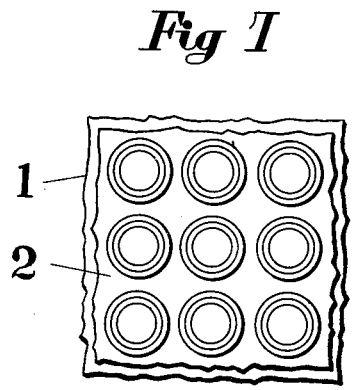
FIG. 7 is a back plan view of a portion of a heat exchanger.

In the form of the invention shown in FIGS. 6 through 8, the lower part of the drawing is the high pressure side, contrary to the foregoing example, and the auxiliary tube plate 2 is fixed to the lower portion of the tube plate 1, wherein the tube is fixed without being expanded. Thus, the pressure imposed on the auxiliary tube plate 2 is entirely supported by the tube plate 1, and the leakage only is prevented by the auxiliary tube plate 2. In the sectional view indicated in FIG. 8 end plate 4' is clamped to end plate 5', similar to the embodiment shown in FIG. 4.

FIG. 9 shows the application of the process to a steam condenser in section.

Herein the leakage is prevented by the welding between the tube 3 and the auxiliary tube plate 2, and the atmospheric pressure imposed due to the vacuum of inside is supported by the tube plate 1 through the elastic material 4". The elastic material 4" serves to relieve moderately the thermal expansion and contraction due to the temperature difference between the tube 3 and the drum of condenser. Namely, as the pressure imposed on the auxiliary tube plate 2 is supported by the tube plate 1 through the elastic material 4", and the tube plate 1 and the tube 3 may be moved mutually (the tube 3 is not expanded in the tube plate 1), the welded portion will never be caused any crack, because there is imposed no such immoderate force due to the difference of thermal expansion.

Figure 4:
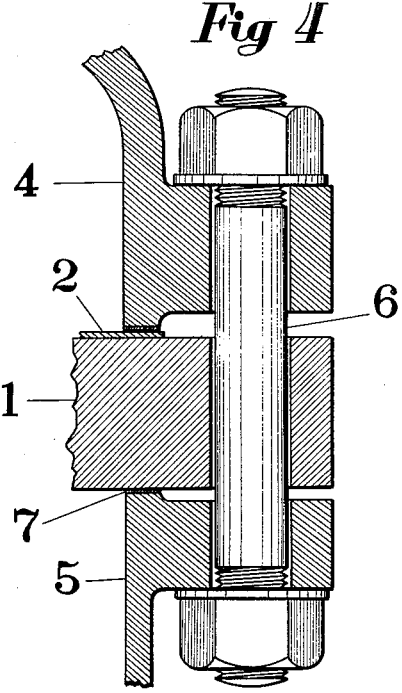
FIG. 4 is a sectional view illustrating the peripheral portion of a portion of a heat exchanger.

The peripheral portion of the auxiliary tube plate 2 is bent and welded to the rib 5" of the tube plate 1 to prevent leakage, as shown in the part A. However, the tube plate 2 in some instances is secured as indicated in FIG. 4 between the tube plate 1 and an associated end plate.

Figure 10:
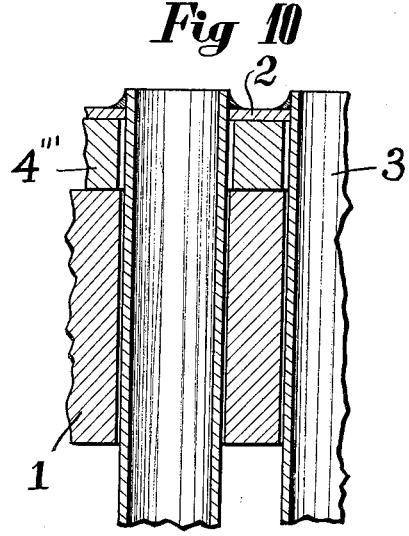

FIG. 10 shows an example of the process in section, wherein the aperture for tube of the auxiliary tube plate 2 is not drawn out. In this embodiment elastic elements which is applied to the drum of a high pressure water tube 4''' are employed between tube plates 1 and 2.

FIG. 11 shows an example of the process in section, boiler. In the drawing, 1 is the tube plate, 2 is the auxiliary tube plate, 3 is the water tube. The water tube 3 is expanded in the tube plate 1 and the end of tube is welded to the auxiliary tube plate 2 to prevent leakage.

The fixing of the water tube 3 to the tube plate 1 is performed at the expanded portion of the tube, and the leakage is prevented by welding of the tube end to the auxiliary tube plate 2, and further the peripheral portion of the auxiliary tube plate 2 is also welded to the tube plate 1 by rib or collar 8 to prevent leakage as shown.

In FIG. 12, the end connection for the tube plate 2 is shown in enlarged scale, wherein 1 is the tube plate, 2 is the auxiliary tube plate and 8 is the rib. The rib 8 is perfectly welded to the tube plate 1 and is annealed. When the bent end of the auxiliary tube plate 2 and the end of the rib 8 are welded together to prevent leakage, the tube plate 1 would not be affected unfavorably, because the welded portion is sufficiently apart from the tube plate 1.

FIG. 13 shows an example similar to FIG. 11 but without forming plate 2 with cylindrical extensions.

Having thus described the invention what is claimed as new and desired to be secured by Letters Patent is:

1. A construction for a vessel subject to internal pressure, comprising an outer supporting wall tube sheet of substantial thickness having a plurality of tube openings, a plurality of tube elements extending freely through said tube openings from outside said vessel and projecting outwardly from the opposite side of said supporting wall tube sheet into the interior of said vessel, an auxiliary sealing-wall tube sheet of relatively slight thickness connected along its periphery to said supporting wall tube sheet and including portions spaced from said supporting wall tube sheet and a plurality of cylindrical extensions positioned over respective ones of said plurality of tubes and welded to said tubes at the ends thereof, and elastic elements disposed between said supporting wall tube sheet and said sealing-wall tube sheet and extending between said tubes.

2. A construction for a vessel subject to internal pressure, comprising an outer supporting wall tube sheet of substantial thickness having a plurality of tube openings, a plurality of tube elements extending freely through said tube openings from outside said vessel and projecting outwardly from the opposite side of said supporting wall tube sheet into the interior of said vessel, an auxiliary sealing-wall tube sheet of relatively slight thickness connected along its periphery to said supporting wall tube sheet and including portions spaced from said supporting wall tube sheet and a plurality of cylindrical extensions positioned over respective ones of the said plurality of tubes and welded to said tubes at the ends thereof, elastic elements disposed between said supporting wall tube sheet and said sealing-wall tube sheet and extending between said tubes, an end plate, said sealing-wall tube sheet being interposed between said end plate and said supporting wall tube sheet, and means to clamp said end plate and said tube sheet together.

References Cited in the file of this patent

UNITED STATES PATENTS

| | | |
|---|---|---|
| 1,589,646 | Hicks | June 22, 1926 |
| 2,047,633 | Jacobus | June 14, 1936 |
| 2,868,513 | Orr et al. | Jan. 13, 1959 |

FOREIGN PATENTS

| | | |
|---|---|---|
| K16,944 | Germany | Oct. 11, 1956 |
| 424,752 | Italy | Sept. 2, 1947 |